Figure 1:
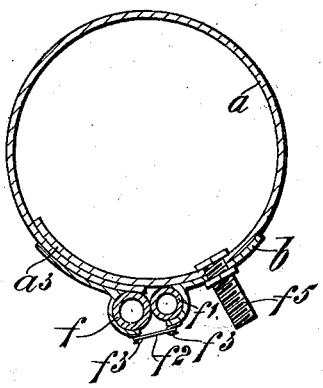

No. 625,052. Patented May 16, 1899.
J. W. McDOUGALL.
PNEUMATIC TIRE.
(Application filed Aug. 11, 1897.)

(No Model.)

WITNESSES:
Ella L. Giles

INVENTOR
John William McDougall.
BY
ATTORNEYS

THE NORRIS PETERS CO., PHOTO-LITHO., WASHINGTON, D. C.

UNITED STATES PATENT OFFICE.

JOHN WILLIAM McDOUGALL, OF NAPIER, NEW ZEALAND.

PNEUMATIC TIRE.

SPECIFICATION forming part of Letters Patent No. 625,052, dated May 16, 1899.

Application filed August 11, 1897. Serial No. 647,889. (No model.)

*To all whom it may concern:*

Be it known that I, JOHN WILLIAM MCDOUGALL, a subject of the Queen of Great Britain, and a resident of Napier, in the Colony of New Zealand, have invented certain new and useful Improvements in Pneumatic Tires, of which the following is a specification.

This invention relates to that class of pneumatic tires which have an inner tube for inflation purposes and a protective cover to withstand wear and tear. The principal advantage of such form of tires is that they can be easily detached from the rim of the wheel for repair, and being in two parts the protective cover when worn can be replaced by a new cover which can be used with the old inner tube. A further advantage is that in case of a small puncture the inner tube may be inflated without fixing the same upon the rim of the wheel and then submerging the same in water, when the bubbles caused by the escaping air will show the position of the puncture. These tires, however, have the disadvantage that the repairing or covering patch must necessarily be fixed upon the outside of the inner tube, and thus the act of inflating after repair tends to and in many cases immediately forces off the patch. To obviate this difficulty, tires known as "tubeless" tires have been designed—that is, tires which are not of closed circular section, but when removed from the rim of the wheel partake more or less of the shape of a flat band. They are usually fixed to the rim of the wheel by lugs, wires, or other contrivances and when so fixed may be inflated and form pneumatic tires. These tubeless tires, however, have the disadvantage that they cannot be inflated except when in position upon the wheel-rim, and although it is easy to take a tire of this class off the wheel and repair a puncture still there is great difficulty in finding the puncture, as the water test cannot be used. By the present invention these difficulties are removed, as I provide an inner tube which is not of closed circular section and can therefore be opened out when removed from the wheel and patched from the inside. Though my tire is not of closed circular section it may be so folded and fastened as to be practically so and may be inflated when removed from the wheel. Thus the water test may be applied, and when the puncture is found the tube may be repaired from the inside. A further advantage of this form of tube is that it may be so strengthened or thickened on the outside as to be capable of resisting wear and tear and may be used without a separate protective cover. My tire may be so constructed that it will fix itself to a rim of concave section by means of retaining-bands, stiffening-pieces, and fastenings used in the construction.

Figure 2:
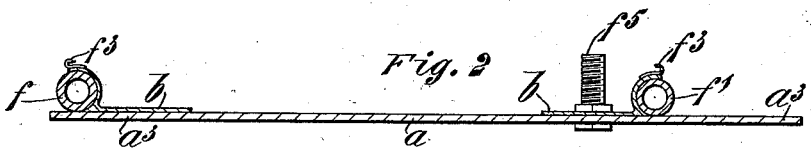
Figure 3:
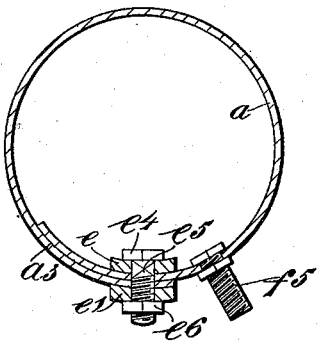

In the drawings, Figure 1 is a sectional view of the tire. Fig. 2 is a similar view of the same opened out. Fig. 3 is a view similar to Fig. 1 of a modification.

Similar letters refer to similar parts.

Referring more particularly to Fig. 1, the band $a$ is folded upon itself to form the secondary chamber $a'$, or this secondary chamber may be formed separately and attached to the band, as shown by dotted lines $a^2$ on Fig. 2.

$b$ is a strengthening-band of calico, canvas, or other suitable material, and $c$ is another similar band.

$d$ is a non-return valve of ordinary construction, which will allow air to pass from the secondary chamber $a'$ into the tire, but prevents its return.

$f^5$ is the ordinary air-admission nozzle and valve to which the force-pump may be applied and through which air may be forced into the chamber $a'$.

$g$ is a hole of sufficient size to pass over the nozzle $f^5$.

$h$ and $h'$ are hooks and eye, respectively.

If the band, as shown on Fig. 2, is folded upon itself and fastened, it will present the form shown on Fig. 1. Air may then be forced through the nozzle and valve $f^5$ into the chamber $a'$, whence it cannot pass until the pressure is sufficient to raise the non-return valve $d$, and the force required to open the said valve may be regulated by adjusting the screw-cap $d'$. It is so regulated that there shall always be sufficient pressure in the chamber $a'$ to force the surfaces $a^3$ into close juxtaposition and make an air-tight joint, so that the air cannot escape when it passes from the chamber $a'$ to the tire, but the tube remains inflated. The action of the restraining-band $c$ assists in effecting this result, since it prevents the chamber $a'$ expanding equally in all directions; but the expansion is mainly downward—that is, toward the rim of the wheel. If desirable, the surfaces $a^3$ may be lubricated with soft soap or other suitable lubricant, which will help to make the joint airtight.

To deflate the tire, the valve $d$ may be raised by passing a wire or the like through the nozzle $f^5$ until the air has escaped.

Fig. 3 is a view similar to Fig. 1, with a strengthening thickness $a^4$ to resist wear and tear, and is thus a tire complete in itself.

What I claim, and desire to secure by Letters Patent of the United States, is—

In combination with the rim, a tire having overlapping surfaces to form a joint and a compression chamber or bands and restraining-bands for making an air-tight joint, an admission-tube leading into the secondary chamber and a non-return valve leading from the chamber into the interior of the tire, the valve of said chamber being arranged to hold a greater pressure in the chamber than in the tire, such tire being capable of being inflated when removed from the rim of the wheel, substantially as described.

In witness whereof I have hereunto subscribed my name this 29th day of June, 1897.

JOHN WILLIAM McDOUGALL.

In presence of—
  G. E. SAINSBURY,
  F. BLAKE.